(12) United States Patent
Hojo

(10) Patent No.: US 12,046,713 B2
(45) Date of Patent: Jul. 23, 2024

(54) ALL-SOLID-STATE BATTERY WITH IMPROVED HIGH-RATE CHARGING RESISTANCE

(71) Applicant: TOYOTA JIDOSHA KABUSHIKI KAISHA, Toyota (JP)

(72) Inventor: Takayuki Hojo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 17/073,633

(22) Filed: Oct. 19, 2020

(65) Prior Publication Data

US 2021/0151789 A1     May 20, 2021

(30) Foreign Application Priority Data

Nov. 20, 2019  (JP) ................. 2019-209937

(51) Int. Cl.
| | |
|---|---|
| *H01M 10/0562* | (2010.01) |
| *H01M 4/134* | (2010.01) |
| *H01M 4/36* | (2006.01) |
| *H01M 4/38* | (2006.01) |
| *H01M 10/0525* | (2010.01) |
| *H01M 4/02* | (2006.01) |

(52) U.S. Cl.
CPC ....... *H01M 10/0562* (2013.01); *H01M 4/134* (2013.01); *H01M 4/366* (2013.01); *H01M 4/386* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2007/0092797 A1* | 4/2007 | Konishiike | H01M 4/386 |
| | | | 29/623.5 |
| 2018/0287145 A1* | 10/2018 | Lee | H01M 4/133 |
| 2020/0161628 A1* | 5/2020 | Yao | H01M 4/0404 |
| 2021/0013496 A1 | 1/2021 | Tsuzuki et al. | |
| 2021/0280869 A1 | 9/2021 | Nakano | |

FOREIGN PATENT DOCUMENTS

| | | |
|---|---|---|
| JP | 2007-122915 A | 5/2007 |
| JP | 2014041783 A | 3/2014 |
| JP | 2015095301 A | 5/2015 |
| JP | 2016154104 A | 8/2016 |
| JP | 2016225187 A | 12/2016 |
| KR | 1020170109293 A | 9/2017 |
| WO | 2014128944 A1 | 8/2014 |
| WO | 2019/187537 A1 | 10/2019 |
| WO | 2020/110666 A1 | 11/2019 |

* cited by examiner

*Primary Examiner* — Zhongqing Wei
(74) *Attorney, Agent, or Firm* — Dickinson Wright, PLLC

(57) ABSTRACT

An all-solid-state battery includes a positive electrode layer, a solid electrolyte layer, and a negative electrode layer. The solid electrolyte layer separates the positive electrode layer and the negative electrode layer. The negative electrode layer includes a first layer and a second layer. The second layer is interposed between the solid electrolyte layer and the first layer. The first layer contains a first particle group. The second layer contains a second particle group. The first particle group and the second particle group contain a silicon material. The second particle group has a smaller average particle diameter than the first particle group.

4 Claims, 1 Drawing Sheet

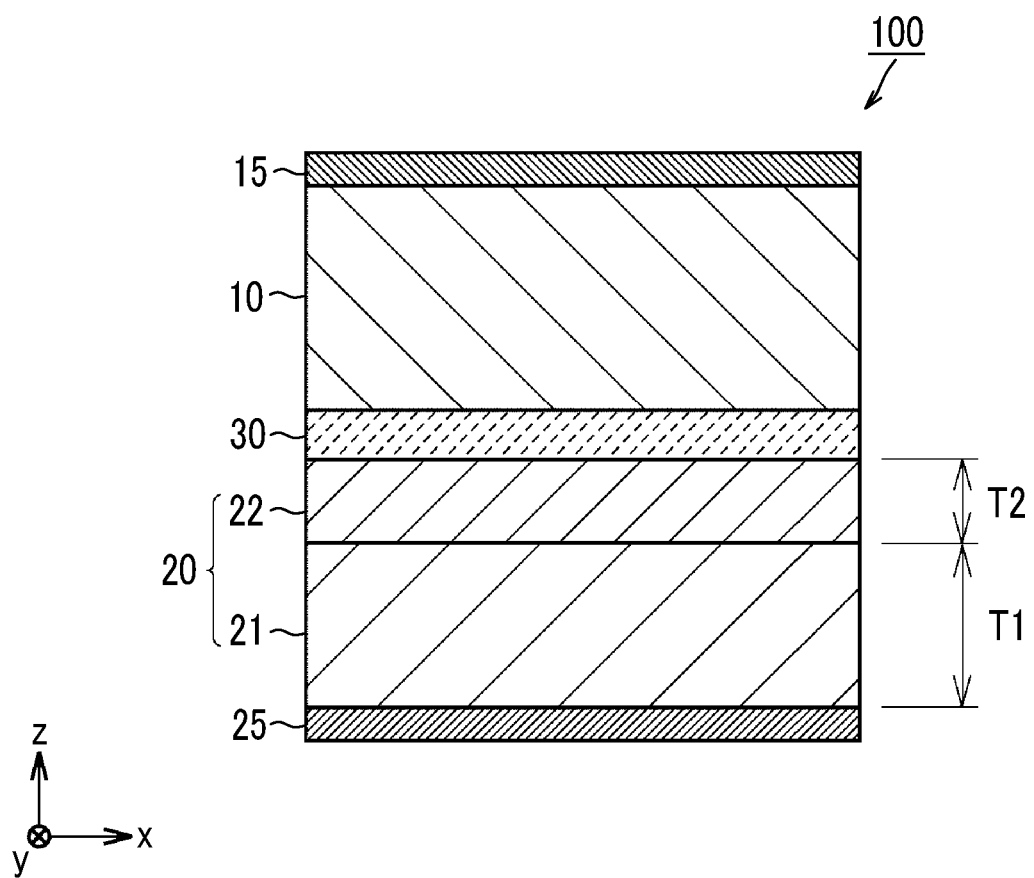

ALL-SOLID-STATE BATTERY WITH IMPROVED HIGH-RATE CHARGING RESISTANCE

CROSS-REFERENCE TO RELATED APPLICATION

This application claims priority to Japanese Patent Application No. 2019-209937 filed on Nov. 20, 2019, incorporated herein by reference in its entirety.

BACKGROUND

1. Technical Field

The present disclosure relates to an all-solid-state battery.

2. Description of Related Art

Japanese Unexamined Patent Application Publication No. 2014-041783 (JP 2014-041783 A) discloses an all-solid-state battery containing silicon (Si) as an active material.

SUMMARY

Charging unevenness may occur in a thickness direction of a negative electrode during charging. It is thought that in the thickness direction of the negative electrode, the closer to the positive electrode, the more easily a charging reaction proceeds, and the further away from the positive electrode, the more difficult the charging reaction is to proceed. There is a tendency that in an all-solid-state battery, charging unevenness is more likely to occur than in a liquid battery. It is thought that this is because lithium (Li) ions are less likely to diffuse in an all-solid-state battery than in a liquid battery.

An Si material has been considered for an all-solid-state battery. The Si material is a negative electrode active material. An advantage of the Si material is that the capacity is large. A disadvantage of the Si material is that an expansion quantity during charging is large.

When a negative electrode contains an Si material and charging unevenness occurs, a difference in expansion quantity occurs in the negative electrode. That is, there is a tendency that in a thickness direction of the negative electrode, a part close to a positive electrode has a relatively large expansion quantity, and a part away from the positive electrode has a relatively small expansion quantity.

Charging unevenness is noticeable during high-rate charging. During high-rate charging, cracks, starting from a part where a difference in expansion quantity is large, may occur in the negative electrode. It is thought that when cracks occur, the battery capacity is reduced.

The present disclosure improves high-rate charging resistance in an all-solid-state battery whose negative electrode contains a silicon material.

Hereinafter, technical configurations and effects of the present disclosure will be described. The mechanism of action in the present disclosure includes estimations. Whether the mechanism of action is right does not limit the scope of the claims.

An aspect of the present disclosure relates to an all-solid-state battery. The all-solid-state battery includes a positive electrode layer, a solid electrolyte layer, and a negative electrode layer. The solid electrolyte layer separates the positive electrode layer and the negative electrode layer. The negative electrode layer includes a first layer and a second layer. The second layer is interposed between the solid electrolyte layer and the first layer. The first layer contains a first particle group. The second layer contains a second particle group. The first particle group and the second particle group contain a silicon material. The second particle group has a smaller average particle diameter than the first particle group.

It is thought that the second particle group is charged in preference to the first particle group during high-rate charging. This is because the second layer (second particle group) is closer to the positive electrode layer than the first layer (first particle group). It is thought that the second particle group expands in preference to the first particle group during high-rate charging. The second particle group has a smaller average particle diameter than the first particle group. It is thought that the second particle group has a smaller expansion quantity than the first particle group. Accordingly, it is thought that a difference in expansion quantity hardly occurs in the negative electrode. Accordingly, it is expected that the frequency of cracks will be reduced during high-rate charging. That is, an improvement of high-rate charging resistance is expected.

In the aspect, a ratio of the average particle diameter of the second particle group to the average particle diameter of the first particle group may be, for example, 80% or less. Hereinafter, the "ratio of the average particle diameter of the second particle group to the average particle diameter of the first particle group" is also referred to as "particle diameter ratio". When the particle diameter ratio is 80% or less, an improvement of high-rate charging resistance is expected.

In the aspect, the ratio of the average particle diameter of the second particle group to the average particle diameter of the first particle group may be, for example, 60% or less. When the particle diameter ratio is 60% or less, an improvement of high-rate charging resistance is expected.

In the aspect, the following formula may be satisfied.

$$(Cp/Cn) \leq \{T2/(T1+T2)\} < 1$$

In the formula, "Cp" represents a single electrode capacity of the positive electrode layer. "Cn" represents a single electrode capacity of the negative electrode layer. "T1" represents a thickness of the first layer. "T2" represents a thickness of the second layer.

When the relationship represented by the formula is satisfied, the second layer (small particle diameter layer) can accept a full charge capacity of the positive electrode. Even when the full charge capacity of the positive electrode is supplied to the negative electrode at once by high-rate charging, the frequency of cracks is expected to be reduced.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a conceptual cross-sectional view showing an all-solid-state battery according to an embodiment.

DETAILED DESCRIPTION OF EMBODIMENTS

Hereinafter, embodiments (hereinafter, also referred to as "the embodiment") of the present disclosure will be described. The following description does not limit the scope of the claims.

In the embodiment, for example, an expression such as "0.1 parts by mass to 10 parts by mass" indicates a range including boundary values unless otherwise specified. For example, "0.1 parts by mass to 10 parts by mass" indicates a range of "0.1 parts by mass or greater and 10 parts by mass or less".

All-Solid-State Battery

FIG. 1 is a conceptual cross-sectional view showing an all-solid-state battery according to the embodiment.

An all-solid-state battery 100 includes a positive electrode layer 10, a solid electrolyte layer 30, and a negative electrode layer 20. The solid electrolyte layer 30 separates the positive electrode layer 10 and the negative electrode layer 20. The positive electrode layer 10, the solid electrolyte layer 30, and the negative electrode layer 20 can form a unit laminate. The all-solid-state battery 100 may include one unit laminate alone. The all-solid-state battery 100 may include a plurality of unit laminates. The unit laminates may be laminated in one direction.

The all-solid-state battery 100 may include a housing (not shown). The housing may house the positive electrode layer 10, the solid electrolyte layer 30, and the negative electrode layer 20. The housing may have an optional form. The housing may be, for example, a pouch formed of an aluminum (Al) laminate film. The housing may be, for example, a metal case.

The all-solid-state battery 100 may further include a positive electrode collector 15. The positive electrode collector 15 may be adhered to the positive electrode layer 10. The positive electrode collector 15 has electron conductivity. The positive electrode collector 15 may include, for example, Al foil. The positive electrode collector 15 may be substantially formed of, for example, Al foil. The positive electrode collector 15 may have a thickness of, for example, 5 µm to 50 µm.

The all-solid-state battery 100 may further include a negative electrode collector 25. The negative electrode collector 25 may be adhered to the negative electrode layer 20. The negative electrode collector 25 has electron conductivity. The negative electrode collector 25 may include copper (Cu) foil, nickel (Ni) foil, or the like. The negative electrode collector 25 may be substantially formed of, for example, Ni foil. The negative electrode collector 25 may have a thickness of, for example, 5 µm to 50 µm.

Negative Electrode

The negative electrode layer 20 is adhered to the solid electrolyte layer 30. The negative electrode layer 20 may have a thickness of, for example, 1 µm to 200 µm. The negative electrode layer 20 may have a thickness of, for example, 10 µm to 100 µm. The negative electrode layer 20 includes a first layer 21 and a second layer 22. For example, the first layer 21 and the second layer 22 each may be independently formed. The negative electrode layer 20 may be formed by bonding the first layer 21 and the second layer 22 together.

First Layer

The first layer 21 is further separated from the positive electrode layer 10 than the second layer 22. The first layer 21 may be adhered to, for example, the negative electrode collector 25. The first layer 21 includes a first particle group. In the embodiment, the "particle group" is a particle agglomerate. The first particle group contains an Si material. Each particle included in the first particle group is made of an Si material.

Hereinafter, particles made of an Si material will also be referred to as "Si particles". In the embodiment, the Si particles are secondary particles (aggregates of primary particles). The Si particles may have an optional shape. The Si particles may have a shape such as a sphere or lump.

The Si material is a negative electrode active material. In the embodiment, the Si material represents a material containing Si. The Si material may further contain an element other than Si as long as it contains Si. The Si material may contain, for example, at least one selected from the group consisting of Si (simple substance), $SiO_x$ ($0<x<2$), and an Si-based alloy.

The first layer 21 may further contain a solid electrolyte material, a conductive material, a binder, and the like in addition to the negative electrode active material (first particle group).

Second Layer

The second layer 22 is interposed between the solid electrolyte layer 30 and the first layer 21. That is, the second layer 22 is closer to the positive electrode layer 10 than the first layer 21. The second layer 22 may be adhered to, for example, the solid electrolyte layer 30. The second layer 22 may be adhered to, for example, the first layer 21.

The second layer 22 includes a second particle group. The second particle group contains an Si material. Each particle included in the second particle group is made of an Si material. The second layer 22 may further contain a solid electrolyte material, a conductive material, a binder, and the like in addition to the negative electrode active material (second particle group).

In the embodiment, the second particle group has a smaller average particle diameter than the first particle group. Therefore, an improvement of high-rate charging resistance is expected. In the embodiment, "high-rate" represents, for example, a current rate of 2 C or higher. C represents a magnitude of the current rate. At a current rate of "1 C", a full charge capacity of the battery is charged in one hour. In the embodiment, the "high-rate charging resistance" represents a property in which the capacity is hardly reduced when high-rate charging is repeated.

Particle Diameter Ratio

A particle diameter ratio is calculated by dividing the average particle diameter of the second particle group by the average particle diameter of the first particle group. The particle diameter ratio is expressed in percentage. After the conversion to percentage, the digits after the decimal point are rounded off. The particle diameter ratio may be, for example, 80% or less. Accordingly, an improvement of high-rate charging resistance is expected. The particle diameter ratio may be, for example, 60% or less. The particle diameter ratio may be, for example, 40% or less. The particle diameter ratio may be, for example, 10% or greater. The particle diameter ratio may be, for example, 20% or greater. The particle diameter ratio may be, for example, 40% or greater.

Method of Measuring Average Particle Diameter

In the embodiment, the average particle diameter of each particle group is measured in a cross-section of the all-solid-state battery 100. A procedure for measuring the average particle diameter is as follows.

The all-solid-state battery 100 is completely discharged. That is, the state of charge (SOC) of the all-solid-state battery 100 is adjusted to substantially 0%. The all-solid-state battery 100 is cut by a cutting machine or the like. Accordingly, a cross-section sample of the negative electrode layer 20 is obtained. The cross-section sample is parallel to a thickness direction of the negative electrode layer 20 (z-axial direction in FIG. 1). However, "parallel" in the embodiment is not used in a strict sense. In the embodiment, a slight deviation from the geometrically perfect parallel relationship is allowed. The angle between the cross-section sample and the thickness direction may be 0 degree to 10 degrees.

A surface of the cross-section sample is cleaned by an ion milling device. After the cleaning, the negative electrode layer 20 is observed by a scanning electron microscope (SEM). For example, first, the first layer 21 is observed. The observation magnification is adjusted so that 10 to 20 Si particles are included in the observed image. Within the image, a particle diameter of each of 10 Si particles is measured. In the embodiment, the particle diameter represents the Feret diameter. An arithmetic average of the 10 particle diameters is regarded as the average particle diameter of the first particle group in the cross-section sample. The average particle diameter of the second particle group in the cross-section sample is measured in the same manner as in the case of the average particle diameter of the first particle group.

Five cross-section samples are prepared. The five cross-section samples are randomly extracted from the negative electrode layer 20. An average particle diameter of the first particle group is measured for each of the five cross-section samples. An arithmetic average of the five average particle diameters is regarded as the average particle diameter of the first particle group in the negative electrode layer 20. Only the integer part of the average particle diameter is available. The fractional part is rounded off.

An average particle diameter of the second particle group is measured for each of the five cross-section samples. An arithmetic average of the five average particle diameters is regarded as the average particle diameter of the second particle group in the negative electrode layer 20. Only the integer part of the average particle diameter is available. The fractional part is rounded off.

In a case where the average particle diameter of the raw material powder is known, the average particle diameter of the raw material powder can be regarded as the average particle diameter of each particle group. The average particle diameter of the raw material powder may be a median diameter in a volume-based particle size distribution (cumulative distribution).

The first particle group may have an average particle diameter of, for example, 0.1 µm to 10 µm. The first particle group may have an average particle diameter of, for example, 1 µm to 10 µm. The first particle group may have an average particle diameter of, for example, 3 µm to 7 µm.

Relationship Between Single Electrode Capacity and Thickness

In the all-solid-state battery 100 according to the embodiment, A relationship represented by Formula (1) may be satisfied.

$$(Cp/Cn) \leq \{T2/(T1+T2)\} < 1 \quad (1)$$

In Formula (1), "Cp" represents a single electrode capacity of the positive electrode layer 10. "Cn" represents a single electrode capacity of the negative electrode layer 20. "T1" represents a thickness of the first layer 21. "T2" represents a thickness of the second layer 22.

In Formula (1), "Cp/Cn" is a ratio of the single electrode capacity of the positive electrode layer 10 to the single electrode capacity of the negative electrode layer 20. "Cp/Cn" is less than 1. "Cn/Cp" that is the reciprocal of "Cp/Cn" is also referred to as "facing capacity ratio". The facing capacity ratio may be, for example, 1.1 or greater, 1.2 or greater, 1.5 or greater, or 2.0 or greater. The facing capacity ratio may be, for example, 3.0 or less.

When the relationship represented by Formula (1) is satisfied, the second layer (small particle diameter layer) can accept a full charge capacity of the positive electrode. Even when the full charge capacity of the positive electrode is supplied to the negative electrode at once by high-rate charging, the frequency of cracks is expected to be reduced.

When a ratio of the second layer 22 (small particle diameter layer) in the negative electrode layer 20 is excessively high, the reaction area may be increased, and the amount of heat generation during charging and discharging may be increased. In addition, when the ratio of the second layer is excessively high, small particles may aggregate, and thus irregularities may be formed on a surface of the negative electrode layer 20. In order to make the disadvantages less likely to occur, "{T2/(T1+T2)}" may be, for example, 0.9 or less, 0.8 or less, 0.7 or less, 0.6 or less, or 0.5 or less.

The thickness "T1" of the first layer 21 is measured in a cross-section sample of the negative electrode layer 20. "T1" can also be measured in the cross-section sample used to measure the average particle diameter described above. "T1" is measured in each of the five cross-section samples. An arithmetic average of five "T1"'s is regarded as "T1" in the negative electrode layer 20 which is a measurement target. The thickness "T2" of the second layer 22 is measured in the same manner as in the case of "T1".

A procedure for measuring the single electrode capacity is as follows.

The SOC of the all-solid-state battery 100 is adjusted to substantially 0%. A disk sample is taken from the all-solid-state battery 100 by a punching punch or the like. The disk sample includes the positive electrode layer 10, the solid electrolyte layer 30, and the negative electrode layer 20. The disk sample has an area of, for example, 1 cm². A positive electrode sample and a negative electrode sample are prepared by division of the disk sample into two in the solid electrolyte layer 30. The positive electrode sample also has a disk shape. The positive electrode sample includes the positive electrode layer 10 and a part of the solid electrolyte layer 30. The negative electrode sample also has a disk shape. The negative electrode sample includes the negative electrode layer 20 and a part of the solid electrolyte layer 30.

The positive electrode sample and Li foil are bonded together so that the positive electrode layer 10 and the Li foil face each other via the solid electrolyte layer 30, whereby a single electrode cell is formed. In a case where the solid electrolyte layer 30 is thin, a solid electrolyte material may be added. The single electrode cell is pressed in the lamination direction of the positive electrode layer 10, the solid electrolyte layer 30, and the Li foil. With Li as a reference electrode, the positive electrode layer 10 is charged and discharged in a SOC range of 0% to 100% at a current rate of 0.1 C. Charging and discharging are performed in a constant temperature bath. A set temperature of the constant temperature bath is 25° C. Charging and discharging are performed three times. A third discharge capacity is regarded as the single electrode capacity (Cp) of the positive electrode layer 10.

The negative electrode sample and Li foil are bonded together so that the negative electrode layer 20 and the Li foil face each other via the solid electrolyte layer 30, whereby a single electrode cell is formed. In a case where the solid electrolyte layer 30 is thin, a solid electrolyte material may be added. The single electrode cell is pressed in the lamination direction of the negative electrode layer 20, the solid electrolyte layer 30, and the Li foil. With Li as a reference electrode, the negative electrode layer 20 is charged and discharged in a SOC range of 0% to 100% at a current rate of 0.1 C. Charging and discharging are performed in a constant temperature bath. A set temperature of the constant temperature bath is 25° C. Charging and discharging are performed three times. A third discharge capacity is regarded as the single electrode capacity (Cn) of the negative electrode layer 20.

Three disk samples are prepared. A single electrode capacity (Cp) of the positive electrode layer 10 is measured in each of positive electrode samples taken from the three disk samples. An arithmetic average of the three single electrode capacities (Cp) is regarded as the single electrode capacity (Cp) of the positive electrode layer 10 in the all-solid-state battery 100.

Three disk samples are prepared. A single electrode capacity (Cn) of the negative electrode layer 20 is measured in each of negative electrode samples taken from the three disk samples. An arithmetic average of the three single electrode capacities (Cn) is regarded as the single electrode capacity (Cn) of the negative electrode layer 20 in the all-solid-state battery 100.

Solid Electrolyte Material

The first layer 21 and the second layer 22 may further contain a solid electrolyte material in addition to the negative electrode active material. The solid electrolyte material has Li ion conductivity. The solid electrolyte material substantially has no electron conductivity. The solid electrolyte material may be commonly contained in the negative electrode layer 20, the solid electrolyte layer 30, and the positive electrode layer 10. The solid electrolyte materials contained in the respective layers may be the same or different from each other.

The solid electrolyte material is a particle group. The solid electrolyte material may have an average particle diameter of, for example, 0.1 μm to 5 μm. The negative electrode active material and the solid electrolyte material may satisfy, for example, a relationship of "negative electrode active material/solid electrolyte material=40/60 to 90/10" in volume ratio. The amounts of the solid electrolyte materials to be blended, respectively, in the first layer 21 and the second layer 22 may be the same or different from each other.

The solid electrolyte material may contain, for example, a sulfide solid electrolyte. The sulfide solid electrolyte may be, for example, glass. The sulfide solid electrolyte may be, for example, glass ceramics (also referred to as "crystallized glass").

The sulfide solid electrolyte contains sulfur (S) and Li. The sulfide solid electrolyte may further contain, for example, phosphorus (P). The sulfide solid electrolyte may further contain, for example, a halogen element. The sulfide solid electrolyte may further contain, for example, iodine (I) or bromine (Br). The sulfide solid electrolyte may further contain oxygen (O), silicon (Si), germanium (Ge), tin (Sn), or the like.

The sulfide solid electrolyte may contain, for example, at least one selected from the group consisting of $Li_2S$—$P_2S_5$, $Li_2S$—$SiS_2$, $LiI$—$Li_2S$—$SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$.

For example, "$Li_2S$—$P_2S_5$" indicates that the sulfide solid electrolyte is formed of a component derived from $Li_2S$ and a component derived from $P_2S_5$. $Li_2S$—$P_2S_5$ can be produced by, for example, a mechanochemical reaction between $Li_2S$ and $P_2S_5$. Among sulfide solid electrolytes, those containing a component derived from $Li_2S$ and a component derived from $P_2S_5$ are also referred to as "$Li_2S$—$P_{2}S_5$-based solid electrolyte". The mixing ratio of $Li_2S$ and $P_2S_5$ is optionally adjusted. $Li_2S$ and $P_2S_5$ may satisfy, for example, a relationship of "$Li_2S/P_2S_5$=50/50 to 90/10" in molar ratio. $Li_2S$ and $P_2S_5$ may satisfy, for example, a relationship of "$Li_2S/P_2S_5$=60/40 to 80/20" in molar ratio.

The solid electrolyte material may contain, for example, an oxide solid electrolyte. The solid electrolyte material may contain, for example, at least one selected from the group consisting of $LiNbO_3$, $Li_3PO_4$, LiPON, $Li_3BO_3$—$Li_2SO_4$, LISICON, and $Li_7La_3Zr_2O_{12}$.

Conductive Material

The first layer 21 and the second layer 22 may further contain a conductive material in addition to the negative electrode active material. The conductive material has electron conductivity. The amount of the conductive material to be blended may be, for example, 0.1 parts by mass to 10 parts by mass with respect to 100 parts by mass of the negative electrode active material. The amounts of the conductive materials to be blended, respectively, in the first layer 21 and the second layer 22 may be the same or different from each other.

The conductive material may contain an optional component. The conductive material may contain, for example, at least one selected from the group consisting of graphite, carbon black, vapor-grown carbon fiber (VGCF), carbon nanotube (CNT), and graphene flake. The conductive materials listed here may be commonly contained in the negative electrode layer 20 and the positive electrode layer 10.

Binder

The first layer 21 and the second layer 22 may further contain a binder in addition to the negative electrode active material. The binder bonds solids together. The amount of the binder to be blended may be, for example, 0.1 parts by mass to 10 parts by mass with respect to 100 parts by mass of the negative electrode active material. The amounts of the binders to be blended, respectively, in the first layer 21 and the second layer 22 may be the same or different from each other.

The binder may contain an optional component. The binder may contain, for example, at least one selected from the group consisting of polyvinylidene fluoride (PVDF), vinylidene fluoride-hexafluoropropylene copolymer (PVDF-HFP), polytetrafluoroethylene (PTFE), butyl rubber (IIR), styrene butadiene rubber (SBR), polyimide (PI), polyacrylic acid (PAA), and carboxymethyl cellulose (CMC). The binders listed here may be commonly contained in the negative electrode layer 20, the solid electrolyte layer 30, and the positive electrode layer 10.

Positive Electrode Layer

The positive electrode layer 10 is adhered to the solid electrolyte layer 30. The positive electrode layer 10 may have a thickness of, for example, 1 μm to 200 μm. The positive electrode layer 10 may have a thickness of, for example, 10 μm to 100 μm. The positive electrode layer 10 contains a positive electrode active material. The positive electrode layer 10 may further contain a solid electrolyte material, a conductive material, a binder, and the like, in addition to the positive electrode active material.

The positive electrode active material is a particle group. The positive electrode active material may have an average particle diameter of, for example, 1 µm to 30 µm. The positive electrode active material may contain an optional component. The positive electrode active material contains, for example, at least one selected from the group consisting of lithium cobaltite, lithium nickelate, lithium manganate, lithium nickel cobalt aluminate, lithium nickel cobalt manganate, and lithium iron phosphate.

Solid Electrolyte Layer

The solid electrolyte layer 30 is interposed between the positive electrode layer 10 and the negative electrode layer 20. The solid electrolyte layer 30 contains a solid electrolyte material. The solid electrolyte layer 30 may be substantially formed of a solid electrolyte material. The solid electrolyte layer 30 may further contain, for example, a binder or the like. The solid electrolyte layer 30 may have a thickness of, for example, 1 µm to 100 µm. The solid electrolyte layer 30 may have a thickness of, for example, 10 µm to 50 µm.

Hereinafter, examples (hereinafter, also referred to as "the example") of the present disclosure will be described. The following description does not limit the scope of the claims.

Manufacturing of All-Solid-State Battery

Example 1

1. Formation of First Layer

The following materials were prepared.

First Particle Group: Si particle group (average particle diameter: 5 µm)

Solid Electrolyte Material: $Li_2S$—$P_2S_5$ [$Li_2S/P_2S_5$=70/30 (molar ratio)]

Negative Electrode Collector: Ni foil

A slurry was prepared by mixing the first particle group, the solid electrolyte material, a binder, and a dispersion medium. The slurry was applied to a surface of the negative electrode collector and dried to form a first layer.

2. Formation of Second Layer

Second Particle Group: Si particle group (average particle diameter: 4 µm)

Solid Electrolyte Material: $Li_2S$—$P_2S_5$ [$Li_2S/P_2S_5$=70/30 (molar ratio)]

Temporary Support: Al foil

A slurry was prepared by mixing the second particle group, the solid electrolyte material, a binder, and a dispersion medium. The slurry was applied to a surface of the temporary support and dried to form a second layer.

3. Formation of Negative Electrode Layer

A temporary laminate was formed by bonding the first layer and the second layer together. In the temporary laminate, the negative electrode collector, the first layer, the second layer, and the temporary support were laminated in this order. By pressing the temporary laminate, the first layer and the second layer were adhered to each other. After the first layer and the second layer were adhered to each other, the temporary support was peeled off from the second layer. Therefore, a negative electrode layer was formed.

4. Formation of Positive Electrode Layer

The following materials were prepared.

Positive Electrode Active Material: lithium nickel cobalt manganate (average particle diameter: 5 µm)

Solid Electrolyte Material: $Li_2S$—$P_2S_5$ [$Li_2S/P_2S_5$=70/30 (molar ratio)]

Positive Electrode Collector: Al foil

A slurry was prepared by mixing the positive electrode active material, the solid electrolyte material, a conductive material, a binder, and a dispersion medium. The slurry was applied to a surface of the positive electrode collector and dried to form a positive electrode layer.

5. Formation of Solid Electrolyte Layer

The following materials were prepared.

Solid Electrolyte Material: $Li_2S$—$P_2S_5$ [$Li_2S/P_2S_5$=70/30 (molar ratio)]

Temporary Support: Al foil

A slurry was prepared by mixing the solid electrolyte material, a binder, and a dispersion medium. The slurry was applied to a surface of the temporary support and dried to form a solid electrolyte layer.

6. Assembling

The negative electrode layer and the solid electrolyte layer were bonded together to form a temporary laminate. In the temporary laminate, the negative electrode collector, the negative electrode layer, the solid electrolyte layer, and the temporary support were laminated in this order. By pressing the temporary laminate, the negative electrode layer (second layer) and the solid electrolyte layer were adhered to each other. After the negative electrode layer and the solid electrolyte layer were adhered to each other, the temporary support was peeled off from the solid electrolyte layer.

The solid electrolyte layer and the positive electrode layer were bonded together to form a unit laminate. By pressing the unit laminate, the solid electrolyte layer and the positive electrode layer were adhered to each other. The unit laminate was housed in a housing.

Therefore, an all-solid-state battery was manufactured. The all-solid-state battery in this example was designed to satisfy the relationship represented by Formula (1) described above. A thickness of the solid electrolyte layer was 30 µm.

Example 2, Example 3, Comparative Example

As shown in the following Table 1, an all-solid-state battery was manufactured in the same manner as in Example 1, except that the average particle diameter of the second particle group was changed.

Evaluation of High-Rate Charging Resistance

The all-solid-state battery was restrained with a pressure of 5 MPa. A discharge capacity (initial capacity) of the all-solid-state battery was measured. After the measurement of the initial capacity, a cycle of charging and discharging was performed 300 times under the following conditions.

Current Rate During Charging: 2 C

Current Rate During Discharging: 1 C

Difference Between Upper SOC Limit and Lower SOC Limit: 70%

After the 300 cycles, a discharge capacity (post-cycle capacity) of the all-solid-state battery was measured. A capacity maintenance ratio was calculated by dividing the post-cycle capacity by the initial capacity. The capacity maintenance ratio is expressed in percentage. The capacity maintenance ratio is shown in the following Table 1. It is thought that the higher the capacity maintenance ratio, the further the high-rate charging resistance is improved.

TABLE 1

| | Negative Electrode Layer | | | High-Rate Charging |
|---|---|---|---|---|
| | First Layer Average Particle Diameter of First Particle Group [μm] | Second Layer Average Particle Diameter of Second Particle Group [μm] | Particle Diameter Ratio [%] | Resistance Capacity Maintenance Ratio After 300 Cycles [%] |
| Example 1 | 5 | 4 | 80 | 91 |
| Example 2 | 5 | 3 | 60 | 94 |
| Example 3 | 5 | 2 | 40 | 95 |
| Comparative Example | 5 | 5 | 100 | 85 |

Results

The above Table 1 shows a tendency that when the second particle group has a smaller average particle diameter than the first particle group, the capacity maintenance ratio is increased. It is thought that since a difference in expansion quantity hardly occurs in the negative electrode layer, the frequency of cracks is reduced.

The above Table 1 shows a tendency that the lower the particle diameter ratio, the higher the capacity maintenance ratio.

The embodiments and the examples are merely examples in all respects. The embodiments and the examples are not limited. The technical scope defined by the description of the claims includes all modifications equivalent to the scope of the claims. The technical scope defined by the description of the claims includes all modifications within the scope equivalent to the description of the claims.

What is claimed is:

1. An all-solid-state battery comprising:
   a positive electrode layer;
   a solid electrolyte layer; and
   a negative electrode layer, wherein:
   the solid electrolyte layer separates the positive electrode layer and the negative electrode layer;
   the negative electrode layer includes a first layer and a second layer;
   the second layer is interposed between the solid electrolyte layer and the first layer;
   the first layer contains a first particle group of a negative electrode active material;
   the second layer contains a second particle group of a negative electrode active material;
   the first particle group of the negative electrode active material contains an active material including silicon and the second particle group of the negative electrode active material contains an active material including silicon; and
   the active material including silicon, which is contained in the second particle group has a smaller average particle diameter than the active material including silicon, which is contained in the first particle group; wherein the following formula is satisfied:

$(Cp/Cn) \leq \{T2/(T1+T2)\} < 1$, wherein,
   Cp represents a single electrode capacity of the positive electrode layer which is determined by bonding a sample of the positive electrode layer with a Li foil such that the solid electrolyte layer is between the positive electrode layer and the Li foil, fully charging and discharging the sample of the positive electrode layer, and measuring the discharge capacity of the sample of positive electrode layer,
   Cn represents a single electrode capacity of the negative electrode layer which is determined by bonding a sample of the negative electrode layer with a Li foil such that the solid electrolyte layer is between the negative electrode layer and the Li foil, fully charging and discharging the sample of the negative electrode layer, and measuring the discharge capacity of the sample of negative electrode layer,
   T1 represents a thickness of the first layer, and
   T2 represents a thickness of the second layer.

2. The all-solid-state battery according to claim 1, wherein a ratio of an average particle diameter of the second particle group to an average particle diameter of the first particle group is 80% or less.

3. The all-solid-state battery according to claim 1, wherein the second layer, being closer to the positive electrode layer in a thickness direction than the first layer, has a smaller expansion quantity than the first layer.

4. The all-solid-state battery according to claim 2, wherein the ratio of the average particle diameter of the second particle group to the average particle diameter of the first particle group is 60% or less, and the average particle diameter of the first particle group is in a range from 0.1 μm to 10 μm.

* * * * *